US011285606B2

(12) United States Patent
Nakayama et al.

(10) Patent No.: US 11,285,606 B2
(45) Date of Patent: Mar. 29, 2022

(54) CONTROL DEVICE, ROBOT, CONTROL METHOD, AND NON-TRANSITORY COMPUTER-READABLE RECORDING MEDIUM

(71) Applicant: CASIO COMPUTER CO., LTD., Tokyo (JP)

(72) Inventors: Kenji Nakayama, Iruma (JP); Toshiya Kuno, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 269 days.

(21) Appl. No.: 16/570,893

(22) Filed: Sep. 13, 2019

(65) Prior Publication Data

US 2020/0108502 A1 Apr. 9, 2020

(30) Foreign Application Priority Data

Oct. 3, 2018 (JP) .............................. JP2018-188452

(51) Int. Cl.
*B25J 9/16* (2006.01)
*B25J 19/02* (2006.01)
*B25J 13/08* (2006.01)

(52) U.S. Cl.
CPC ........... *B25J 9/1676* (2013.01); *B25J 9/1666* (2013.01); *B25J 9/1692* (2013.01); *B25J 9/1697* (2013.01); *B25J 13/081* (2013.01); *B25J 19/023* (2013.01); *G05B 2219/39096* (2013.01)

(58) Field of Classification Search
CPC ...... G25J 9/1605; G25J 9/1617; G25J 9/1664; G25J 9/1666; G25J 9/1671; G25J 9/1674; G25J 9/1676; G25J 9/1692; G25J 9/1694; G25J 9/1697; G05B 2219/39096; G05B 2219/39094; G05B 2219/39093
See application file for complete search history.

(56) References Cited

U.S. PATENT DOCUMENTS

| 9,550,295 B2 | 1/2017 | Shiratsuchi |
| 2013/0345872 A1* | 12/2013 | Brooks ................... G06F 17/00 700/259 |
| 2015/0328776 A1 | 11/2015 | Shiratsuchi |

FOREIGN PATENT DOCUMENTS

| JP | 10296679 A | * 11/1998 |
| JP | H10296679 A | 11/1998 |
| JP | H1128686 A | 2/1999 |
| JP | 2001315087 A | 11/2001 |
| JP | 5872077 B2 | 1/2016 |

* cited by examiner

*Primary Examiner* — Spencer D Patton
(74) *Attorney, Agent, or Firm* — Holtz, Holtz & Volek PC (57) ABSTRACT

A control device includes a processor which, when an accessory is fitted onto an apparatus, controls a driver such that the accessory interferes with operation of a movable part of the apparatus, acquires data indicating a position of the movable part at which the accessory interferes with the operation of the movable part, and controls the driver such that the movable part is driven within a movable range which is set based on the acquired data indicating the position of the movable part.

10 Claims, 10 Drawing Sheets

CONTROL DEVICE, ROBOT, CONTROL METHOD, AND NON-TRANSITORY COMPUTER-READABLE RECORDING MEDIUM

CROSS-REFERENCE TO RELATED APPLICATION

This application claims the benefit of Japanese Patent Application No. 2018-188452, filed on Oct. 3, 2018, the entire disclosure of which is incorporated by reference herein.

FIELD

This application relates to a control device, a robot, a control method, and a non-transitory computer-readable recording medium.

BACKGROUND

A control device for controlling an apparatus that includes a robot arm as movable part is known. For example, a control device disclosed in Unexamined Japanese Patent Application Publication No. 2001-315087 stores first coordinates information regarding the robot arm and second coordinates information corresponding to a predetermined interference region with respect to the robot arm, and determines in real-time, based on the first and second coordinates information, whether or not the robot arm will penetrate into the interference region.

SUMMARY

According to one aspect of the present disclosure, a control device includes a processor configured to:

determine whether or not an accessory fitted onto an apparatus interferes with operation of a movable part of the apparatus;

set a movable range of the movable part to a range within which operation of the movable part is not interfered by the attachment, when a determination is made that the accessory interferes with operation of the movable part; and control a driver that drives the movable part such that the movable part is driven within the set movable range.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a control device and a robot (an apparatus) according to an embodiment of the present disclosure are described with reference to the drawings.

Figure 1:
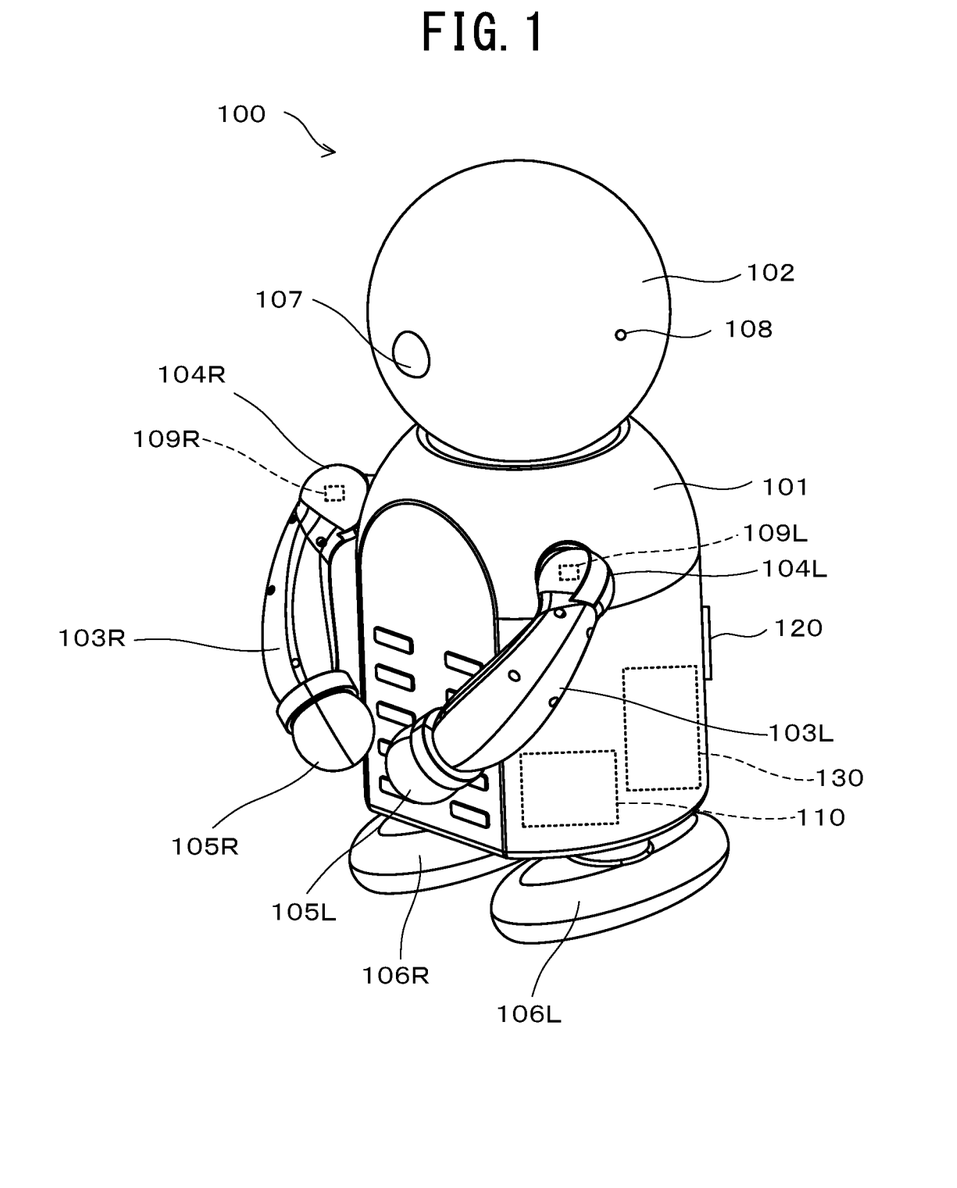
FIG. 1 is a diagram illustrating a robot according to an embodiment of the present disclosure.
Figure 9:
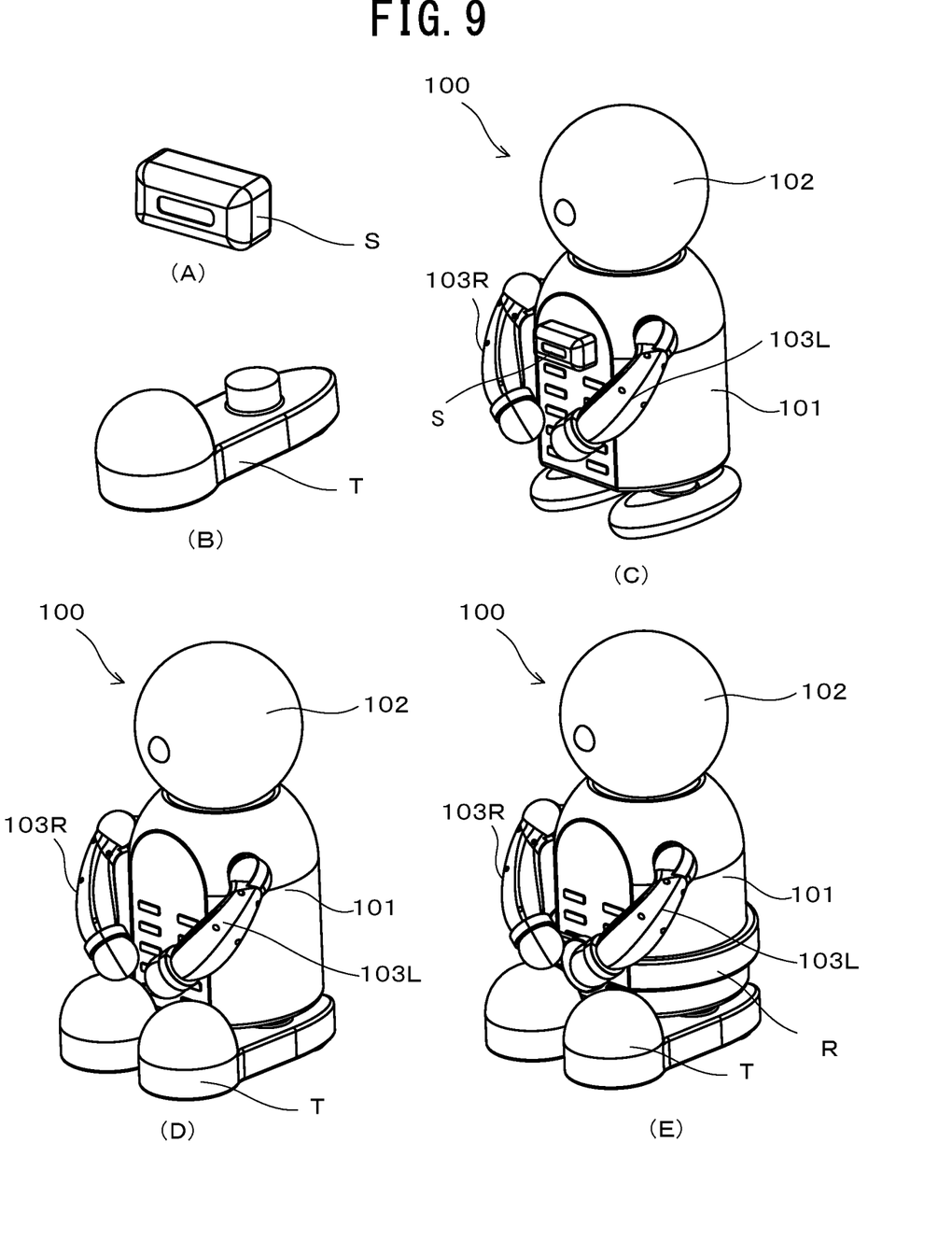
FIG. 9 is a diagram illustrating views (A) to (B) illustrating accessories according to another embodiment of the present disclosure and views (C) to (E) in which a robot according the another embodiment of the present disclosure is fitted with the accessories.

A robot 100 according to the embodiment, as illustrated in FIG. 1, has a shape that is deformed from a human, and includes a torso (a main body) 101, a head 102, a right arm (a first movable part) 103R and a left arm (a second movable part) 103L, a first driver 104R and a second driver 104L, a right hand 105R and a left hand 105L, a right foot 106R and a left foot 106L, an imager 107, and a microphone 108, and an operation unit 120. The torso 101 internally includes a controller (a control device) 110 and a power supply 130. The robot 100 can be fitted with an accessory (see FIG. 7 and FIG. 9 in particular which are described further below) for decorating the robot 100 for example After the accessory is fitted onto the robot 100, the robot 100 sets a movable range in which the accessory does not interfere with the operation of the right arm 103R and the left arm 103L, and then executes operation of the right arm 103R and the left arm 103L within this movable range. The term "interference" encompasses hampered operation of the right arm 103R and the left arm 103L. In the present embodiment, an example is described in which a determination is made as to whether or not the accessory interfered with operation of the right arm 103R and the left arm 103L based on whether or not the right hand 105R and the left hand 105L come into contact with the accessory. Hereinafter the meaning of the expression "come into contact" includes the meaning of "interfere".

One end of the right arm 103R is attached to the robot 100 at a position of the right shoulder of the torso 101 via the first driver 104R. One end of the left arm 103L is attached to the robot 100 at a position of the left shoulder of the torso 101 via the second driver 104L.

Figure 2:
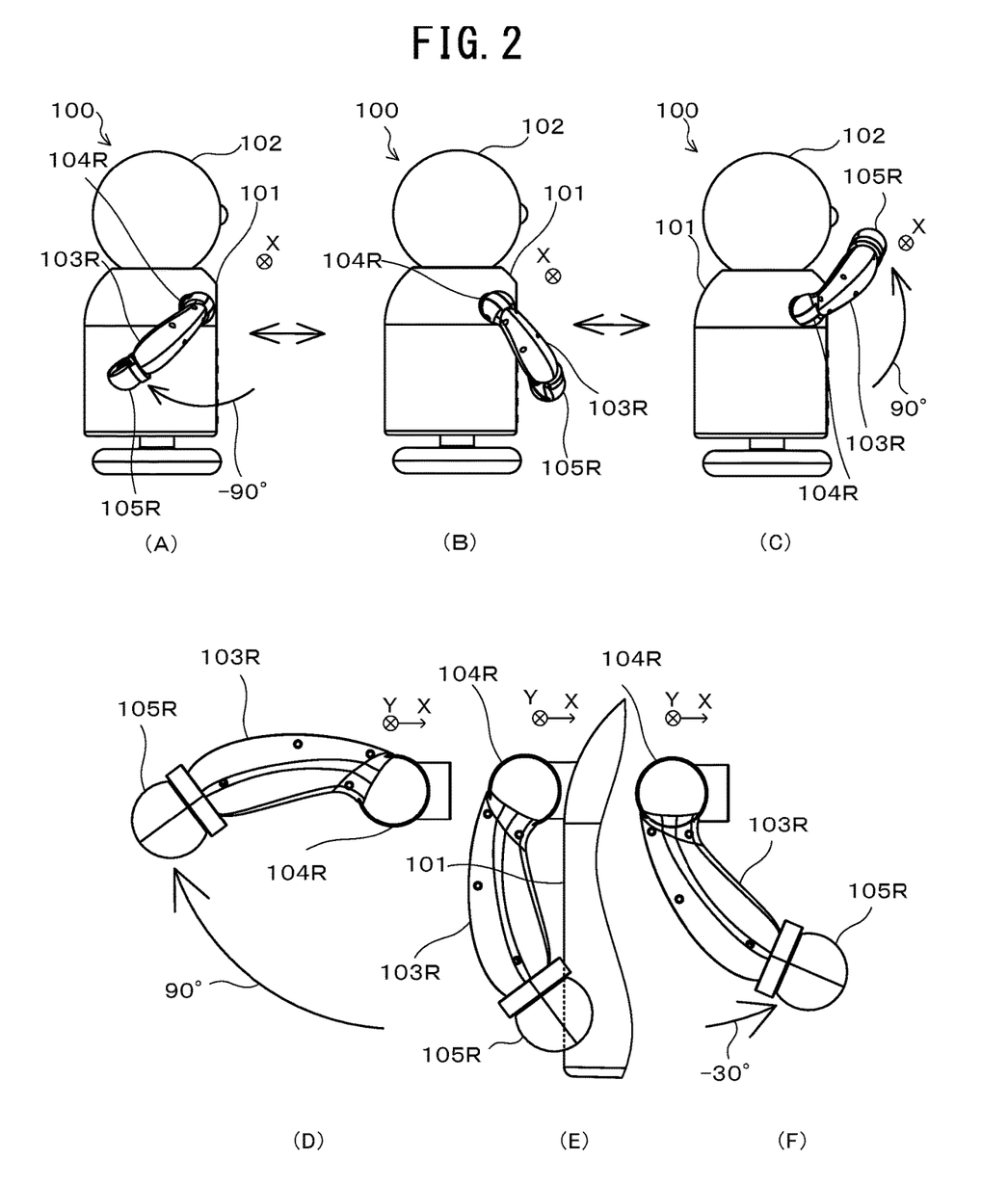
FIG. 2 is a diagram illustrating side views (A) to (C) illustrating movement of the robot according to the embodiment of the present disclosure and views (D) to (F) illustrating movement of a right arm of the robot according to the embodiment of the present disclosure.

The first driver 104R, as illustrated in (A) of FIG. 2 to (C) of FIG. 2, drives the right arm 103R such that the right arm 103R rotates back and forth around the X-axis, and as illustrated in (D) of FIG. 2 to (F) of FIG. 2, drives the right arm 103R such that the right arm 103R rotates in a direction away from the torso 101 or a direction towards the torso 101 around the Y-axis. The X-axis extends in the right-left direction as viewed from the robot 100 and the Y-axis is perpendicular to the X-axis. In a case in which the right arm 103R is positioned in the position illustrated in (B) of FIG. 2, the rotational angle of the right arm 103R around the X-axis (hereinafter referred to as "X-axis rotational angle of right arm 103R") is 0°. When the first driver 104R causes the right arm 103R to rotate around the X-axis (X-axis rotation) to −90°, the right hand 105R moves to the position illustrated in (A) of FIG. 2. The X-axis rotational angle of the right arm 103R in this case is −90°, and this is to be regarded as the initial position. When the first driver 104R causes the right arm 103R to perform a 90° X-axis rotation, the right arm 103R moves to the position indicated in (C) of FIG. 2. The X-axis rotational angle of the right arm 103R at this position is 90°, and this is to be regarded as the end point angle (the limit angle).

Also, the rotational angle of the right arm 103R around the Y-axis (hereinafter referred to as "Y-axis rotational angle of the right arm 103R") where the right hand 105R is at the drooping position illustrated in (B) of FIG. 2 and (E) of FIG. 2 is 0°. When the first driver 104R causes the right arm 103R to rotate 90° around the Y-axis (the Y-axis rotation) from this position, the right arm 103R moves to a position that is away from the torso 101 as illustrated in (D) of FIG. 2. This position is to be regarded as the initial position and the Y-axis rotational angle of the right arm 103R is 90°. When the right arm 103R performs a Y-axis rotation in the opposite direction, the right arm 103R moves to a position overlapping with the torso 101 as viewed from the Y-axis direction as illustrated in (F) of FIG. 2. The Y-axis rotational angle of the right arm 103R in this position is −30°. Similar to that of the first driver 104R, the second driver 104L causes the left arm 103L to perform Y-axis rotation and X-axis rotation around the X-axis and the Y-axis.

Also, the first driver 104R and the second driver 104L are operated by the actuators that are controlled by controller 110 and the rotational angles of the X-axis and the Y-axis are sensed by first potentiometers 109R included in the first driver 104R and second potentiometers 109L included in the second driver 104L illustrated in FIG. 1. The first potentiometers 109R and the second potentiometers 109L output data indicating the X-axis rotational angle and the Y-axis rotational angle corresponding to the left arm 103L and the right arm 103R to the controller 110. The first driver 104R and second driver 104L are controlled by the controller 110 such that there is no mutual interference between the (i) right arm 103R and right hand 105R and the (ii) left arm 103L and left hand 105L. Also, the data indicating the X-axis and Y-axis rotational angles includes data indicating the positions of right arm 103R (including the right hand 105R) and the left arm 103L (including the left hand 105L), which are movable parts.

Figure 3:
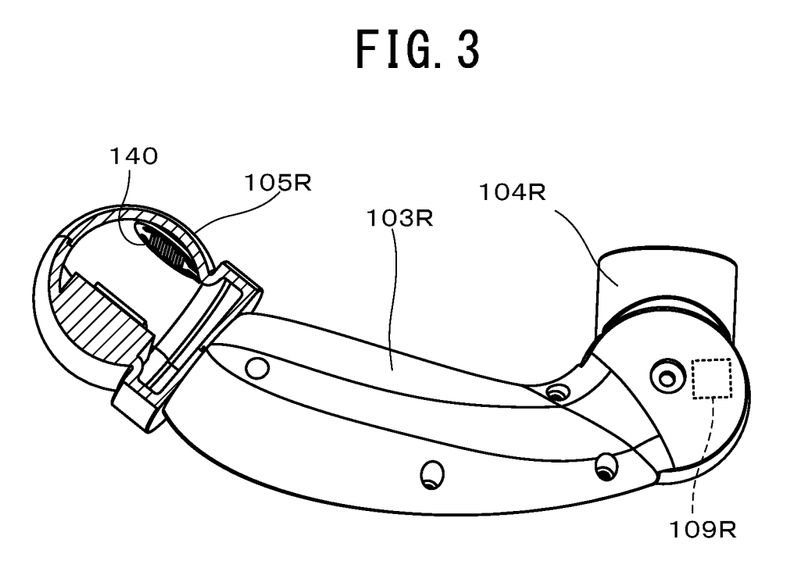
FIG. 3 illustrating a fragmentary view of the right arm of the robot according to the embodiment of the present disclosure.

The right hand 105R is attached to the other end of the right arm 103R. The left hand 105L is attached to the other end of the left arm 103L. The right hand 105R and the left hand 105L are hollow members having an elastic body made of rubber, for example. Within each of the right hand 105R and the left hand 105L a pressure sensor 140 is placed as illustrated in FIG. 3 (illustrated only on the right arm 103R). The pressure sensor 140 in the right hand 105R (the pressure sensor 140 in the left hand 105L) detects pressure when elastic deformation occurs due to the right hand 105R (the left hand 105L) coming into contact with an accessory or the like, and outputs data indicating the pressure to the controller 110. In doing so, a determination can be made as to whether or not the right hand 105R (the left hand 105L) come into contact with the torso 101 or the accessory, for example. As a result of the right hand 105R (the left hand 105L) coming into contact with the accessory, a determination can be made as to whether or not the accessory interfered with the operation of the right arm 103R (the left arm 103L).

The right foot 106R and the left foot 106L illustrated in FIG. 1 are attached to the bottom portion of the torso 101 and, being driven by non-illustrated drivers based on the controller 110, autonomously move the robot 100. By driving the right foot 106R and the left foot 106L, the robot 100 moves forward, backward, rotate to the right, and rotate to the left.

The imager 107 is a camera that is provided at the position of a nose on the head 102. The imager 107 captures a prescribed subject such as the robot 100 that is reflected in a mirror, and outputs data indicating the captured image to the controller 110.

One microphone 108 is placed at a position of the right ear and another microphone 108 is placed a position of the left ear of the head 102. The microphones 108 output data indicating the collected sounds to the controller 110.

Figure 4:
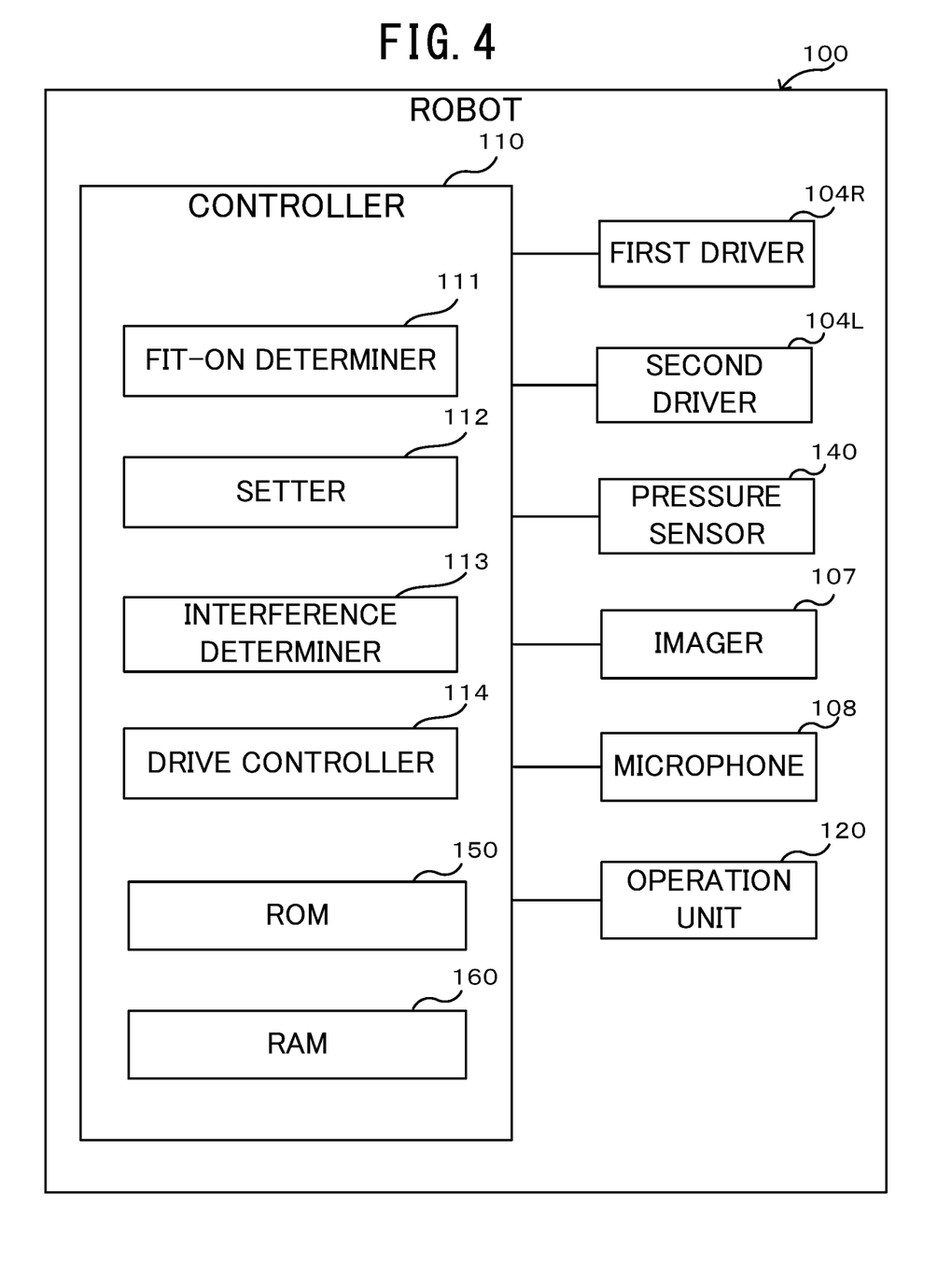
FIG. 4 is a block diagram illustrating a configuration of the robot according to the embodiment of the present disclosure.

The controller 110 includes, as illustrated in FIG. 4, a central processing unit (CPU), a read-only memory (ROM), 150, and a random access memory (RAM) 160. The ROM 150 includes a nonvolatile memory such as a data rewritable flash memory and stores programs for achieving the various functions of the controller 110, data indicating the initial image (initial image of the robot 100) being an image of the robot 100 in a prescribed initial state, and data indicating an initial movable range (movable range while the robot 100 is not fitted with an accessory), interference points (points at which the right hand 105R or the left hand 105L come into contact with the accessory), a movable boundary line (line interconnecting interference points), and a movable range (movable range when the robot 100 is fitted with the accessory). The RAM 160 includes a volatile memory and is used as a working region for execution of programs for the controller 110 to perform various types of processing. As the CPU reads a program that is stored in the ROM 150 and executes the program on the RAM 160, the controller 110 functions as a fit-on determiner 111, a setter 112, an interference determiner 113, and a drive controller 114.

The fit-on determiner 111, determines, based on sounds and/or images, whether or not the accessory for decorating the robot 100, for example, is fitted onto the robot 100. The fit-on determiner 111 detects an utterance from a user via the microphone 108, and determines, using conventional voice analysis for example, whether or not the voice utterance from the user includes an utterance indicating that the robot 100 has been fitted with the accessory. Based on this determination result, the fit-on determiner 111 then makes a determination as to whether or not the robot 100 has been fitted with the accessory. The voice utterance indicating that the accessory has been fitted onto the robot 100 includes, for example "The _______ is fitted". Also, the fit-on determiner 111 acquires an image captured by the imager 107 and determines whether or not the robot 100 is fitted with the accessory. Specifically, in a case in which the robot 100 reflected in a mirror appears in the image captured by the imager 107, a conventional technique is used to compare the image captured by the imager 107 against the initial image stored in the ROM 150. A determination is then made, based on this comparison result, as to whether or not the robot 100 is fitted with the accessory. The fit-on determiner 111 may determine whether or not the robot 100 is fitted with the accessory based on both the voice utterance and the image or any one of the voice utterance and the image.

Upon the accessory being fitted onto the robot 100, the setter 112 executes an interference drive control processing in which first driver 104R and the second driver 104L are controlled such that the right hand 105R and the left hand 105L come into contact with the accessory, and then sets movable ranges of the right hand 105R and the left hand 105L based on the positions of the right hand 105R and the left hand 105L that were detected upon the making of the determination that the right hand 105R and the left hand 105L came into contact with the accessory within the initial movable range. The initial movable range is a movable range of the movable parts while the robot 100 is not fitted with an accessory. This initial movable range is set to a movable range in which the movable parts will not come into contact with other portions (the torso 101, the head 102, the right foot 106R, and the left foot 106L), and this set initial movable range is stored in advance in the ROM 150. The position of the right hand 105R is indicated by the rotational angles of the X-axis and the Y-axis of the first driver 104R and the position of the left hand 105L is indicated by the rotational angles of the X-axis and the Y-axis of the second driver 104L.

The setter 112 causes the left arm 103L to perform X-axis rotation and Y-axis rotation and when a determination is made by the interference determiner 113 that the left hand 105L came into contact with the accessory, the setter 112 stores the X-axis rotational angle and the Y-axis rotational angle of the left arm 103L as interference points into the ROM 150. For the right arm 103R, the interference points are likewise stored into the ROM 150. Next, the setter 112 creates maps of the movable ranges of the right arm 103R and the left arm 103L and stores them into the ROM 150. For example, a map of a movable range is created based on the X-axis rotational angle and the Y-axis rotational angle of the left arm 103L that are stored in the ROM 150 as the interference points, and then stored into the ROM 150. A map of the movable range for the right arm 103R is likewise created and stored into the ROM 150. When a determination is made that the accessory interferes with operation of the right hand 105R and the left hand 105L, the setter 112 sets the movable range of the movable part to a range that is narrower than when a determination is made that the accessory does not interfere with operation of the right hand 105R and the left hand 105L.

The interference determiner 113 makes a determination as to whether or not the right hand 105R or the left hand 105L came into contact with the accessory. The determination as to whether or not the right hand 105R or the left hand 105L came into contact with the accessory is interference is performed based on whether or not a pressure that is greater than or equal to a reference value is detected by the pressure sensors 140 that are arranged on the right hand 105R and the left hand 105L. Also, in a case in which a pressure that is greater than or equal to the reference value is detected when the right hand 105R or the left hand 105L was driven within the initial movable range, the interference determiner 113 determines that the right hand 105R or the left hand 105L came into contact with the accessory.

The drive controller 114 refers to the created map of the movable range stored in the ROM 150 and controls the first driver 104R and the second driver 104L such that the right arm 103R and the left arm 103L are respectively driven within the set movable range. Also, the drive controller 114 includes an initial movable range acquirer that refers to the initial movable range that is stored in the ROM 150 and in a case in which the robot 100 is not fitted with an accessory, the drive controller 114 drives the left arm 103L and the right arm 103R within the initial movable range.

The operation unit 120, being disposed on the back of the torso 101, is for operating the robot 100 and includes a power button.

The power supply 130 includes rechargeable battery that is stored inside the torso 101. The power supply 130 supplies power to the individual components of the robot 100.

Next, a drive processing that is executed by the robot 100 which includes the aforementioned configuration is described. In the drive processing, processing is executed in which movable ranges are set such that when an accessory is attached to the robot 100, the right arm 103R and the left arm 103L of the robot do not come into contact with the accessory, and the right arm 103R and the left arm 103L are driven within the set movable ranges. Once the accessory is attached to the robot 100, the user says "The ______ is fitted" to the robot 100 or positions the robot 100 such that the robot 100 faces a mirror.

Figure 5:
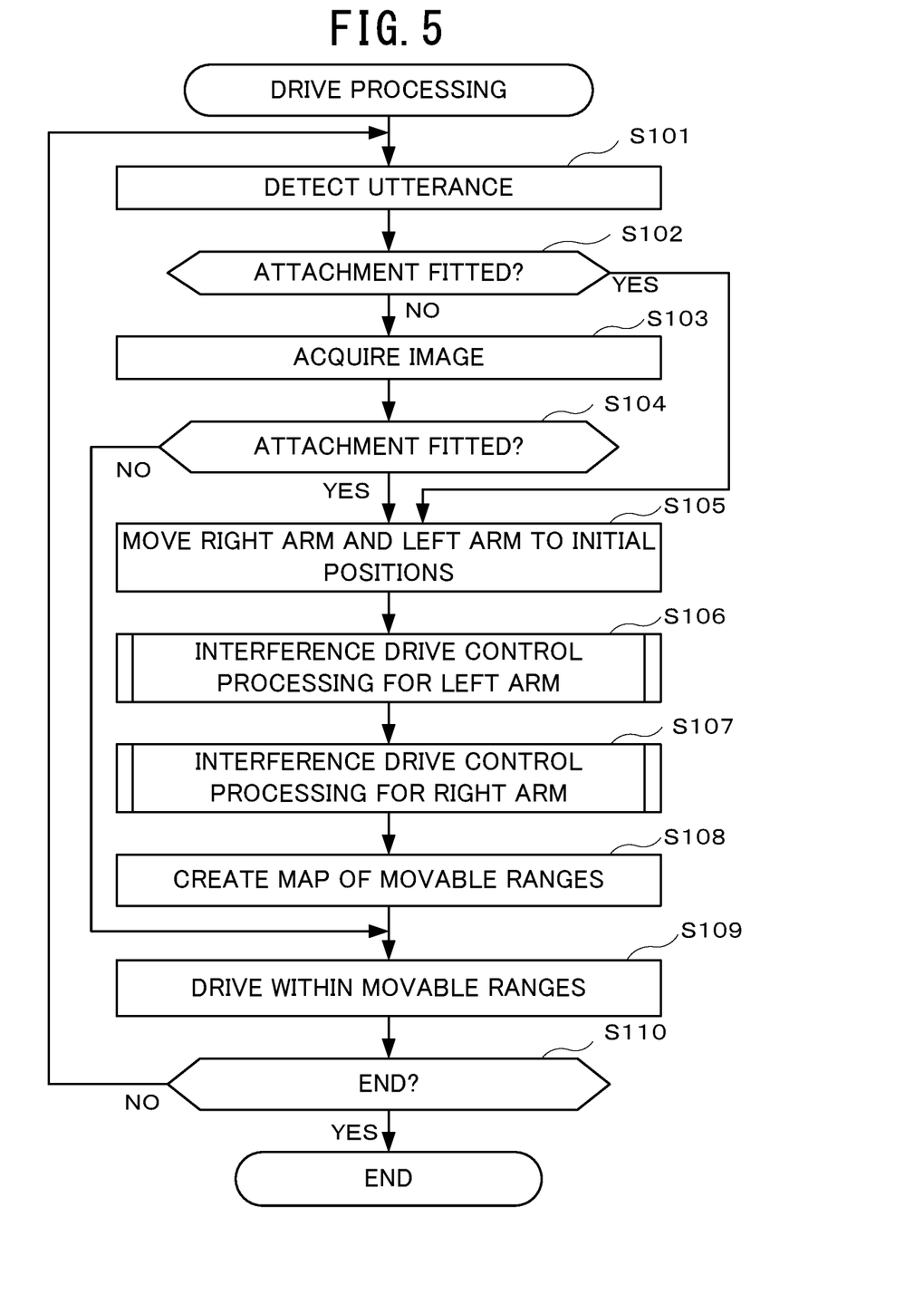
FIG. 5 is a flowchart illustrating a drive processing according to the embodiment of the present disclosure.

When the user turns the power button ON by operating the operation unit 120, the robot 100 responds to the instruction to turn the power ON and starts the drive processing illustrated in FIG. 5. Next, the drive processing that is executed by the robot 100 is described with reference to the flowchart.

First, the fit-on determiner 111 detects an utterance uttered by the user (step S101). Next, the fit-on determiner 111 makes a determination as to whether or not the utterance uttered by the user includes an utterance indicating that the accessory is fitted on the robot 100 (step S102). The utterance indicating that the accessory is fitted onto the robot 100 includes for example "The ______ is fitted". When a determination is made that there is no utterance indicating that the accessory has been fitted onto the robot 100, (NO in step S102), the image captured by the imager 107 is acquired (step S103). Next, the fit-on determiner 111 determines whether or not the accessory is fitted onto the robot 100 (step S104). Specifically, in a case in which the robot 100 reflected in a mirror appears in the image captured by the imager 107, the image captured by the imager 107 is compared against an initial image stored in the ROM 150, and then a determination is made as to whether or not the accessory is fitted onto the robot 100. If a determination is made that the accessory is not fitted onto the robot 100 (NO in step S104), processing then proceeds to step S109, which is described further below.

If a determination is made that the utterance uttered by the user includes an utterance indicating that the accessory has been fitted onto the robot 100 (YES in step S102), or if a determination is made that the robot 100 reflected in the mirror within the image is fitted with an accessory (YES in step S104), the setter 112 moves the right arm 103R and the left arm 103L to the initial position (step S105). Specifically, the setter 112 controls the first driver 104R and the second driver 104L that respectively drives the right arm 103R and the left arm 103L such that the X-axis rotational angle is −90° (position illustrated in (A) of FIG. 2) and the Y-axis rotational angle is 90° (position illustrated in (D) of FIG. 2) for each arm. Next, the interference drive control processing for the left arm is executed (step S106).

Figure 6:
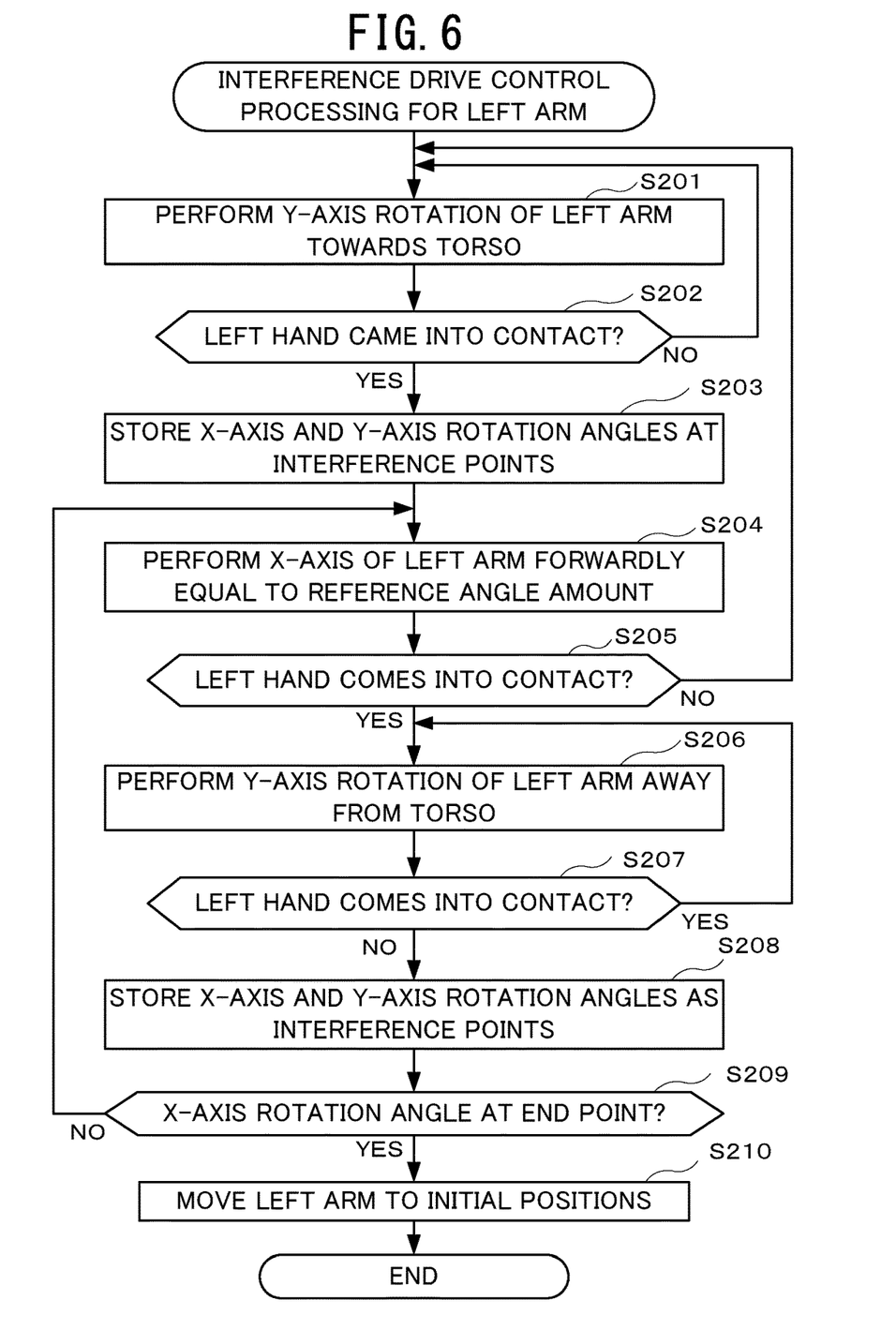
FIG. 6 is a flowchart illustrating an interference drive control processing for a left arm according to the embodiment of the present disclosure.

Once the interference drive control processing for the left arm illustrated in FIG. 6 begins, the setter 112 causes the left arm 103L to perform Y-axis rotation towards the torso 101 while keeping the X-axis rotational angle the same within the initial movable range (step S201). The Y-axis rotation of the left arm 103L in the direction of the torso 101 is performed to cause the left hand 105L to come into contact with the accessory fitted onto the torso 101. Next, the interference determiner 113 makes a determination as to whether or not the left hand 105L came into contact with the accessory (step S202). The determination as to whether or not the left hand 105L came into contact with the accessory is performed based on whether or not a pressure that is greater than or equal to a reference value is detected by the pressure sensor 140 that is arranged on the left hand 105L.

If a pressure that is greater than or equal to the reference value is detected within the initial movable range, a determination is made that the left hand 105L came into contact with the accessory. If a determination is made that the left hand 105L didn't come into contact (NO in step S202), step S201 to step S202 is repeated and Y-axis rotation of the left arm 103L is performed even further towards the torso 101. If a determination is made that the left hand 105L came into contact (YES in step S202), the setter 112 stores the X-axis rotational angle and the Y-axis rotational angle of the left arm 103L at that time as interference points into the ROM 150 (step S203).

Next, an X-axis rotation equal to the reference angle amount is performed on the left arm 103L while keeping the Y-axis rotational angle the same (step S204). The reference angle amount is for example, 1°. Next, the interference determiner 113 makes a determination as to whether or not the left hand 105L still comes into contact with the accessory (step S205). If a determination is made that the left hand 105L no longer comes into contact (NO in step S205), processing is returned to step S201. If a determination is made that the left hand 105L comes into contact (YES in step S205), Y-axis rotation of the left arm 103L is performed while keeping the X-axis rotational angle the same, and the left hand 105L is driven in a direction away from the torso 101 (step S206). Next, the interference determiner 113 makes a determination as to whether or not the left hand 105L still comes into contact with the accessory (step S207). If a determination is made that there is interference (YES in step S207), step S206 to step S207 is repeated. Then, if a determination is made that the left hand 105L has moved away from the accessory to the point where the left hand 105L no longer comes into contact with the accessory (NO in step S207), the X-axis rotational angle and the Y-axis rotational angle of the left arm 103L at that time are stored as interference points into the ROM 150 (step S208). The X-axis rotational angle and the Y-axis rotational angle of the left arm 103L just prior to that determined as NO in step S207 may be stored as interference points into the ROM 150.

Next, a determination is made as to whether or not the X-axis rotational angle of the left arm 103L is the end point angle (YES in step S209). If the X-axis rotational angle is 90°, a determination is made that the X-axis rotational angle is at the end point angle. If a determination is made that it is not the end point angle (NO in step S209), step S204 to step S209 is repeated. If a determination is made that the X-axis rotational angle is the end point angle (YES in step S209), the left arm 103L is returned to the initial position (step S210). Thereafter, processing returns to the drive processing illustrated in FIG. 5 from which the interference drive control processing for the right arm is executed (step S107).

The interference drive control processing for the right arm is the same as the interference drive control processing for the left arm illustrated in FIG. 6, except for the fact that the right arm 103R is used instead of the left arm 103L. Therefore, a detailed description of the interference drive control processing for the right arm is omitted.

Next, the setter 112 uses the X-axis rotational angle and the Y-axis rotational angle of the left arm 103L that are stored as interference points in to ROM 150, creates a map of the movable range that is for when the accessory is fitted onto the robot 100, and stores the created map into the ROM 150 (step S108). For the right arm 103R, a map of the movable range is likewise created and stored in the ROM 150. Next, the drive controller 114 refers to the created map of the movable range that is for when the accessory is fitted onto the robot 100, which is stored into the ROM 150, and controls the first driver 104R and the second driver 104L such that the right arm 103R and the left arm 103L are respectively driven within the set movable range (step S109). When the robot 100 is not fitted with an accessory, the drive controller 114 drives the right arm 103R and the left arm 103L within the initial movable range. Next, a determination is made as to whether or not an end instruction is received (step S110). If a determination is made that an end instruction was not received (NO in step S110), step S101 to step S110 is repeated. If a determination is made that an end instruction was received (YES in step S110), the drive processing is ended.

Figure 7:
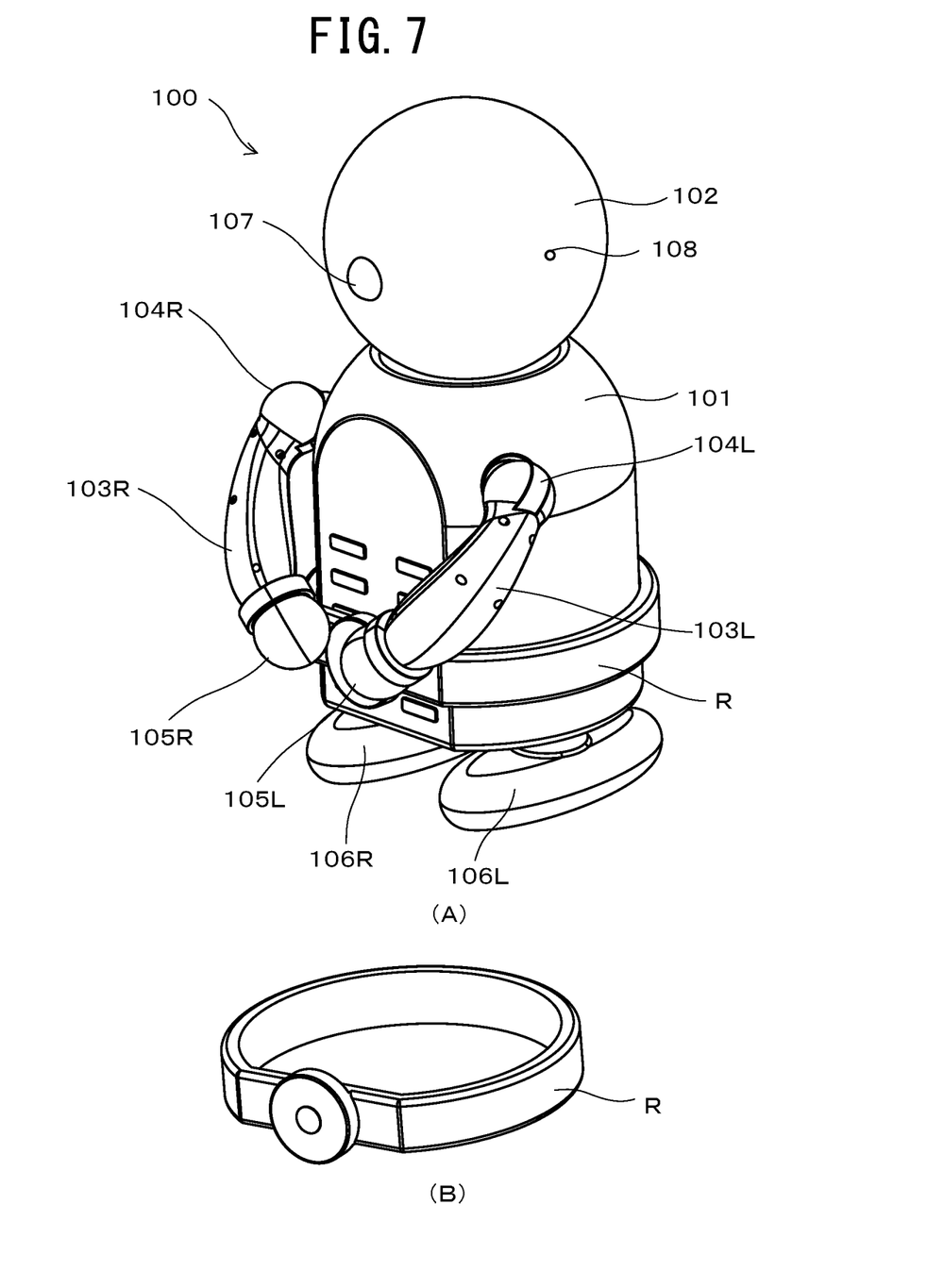
FIG. 7 is a diagram illustrating a view (A) illustrating the robot according to the embodiment of the present disclosure fitted with an accessory and a view (B) illustrating the accessory.
Figure 8:
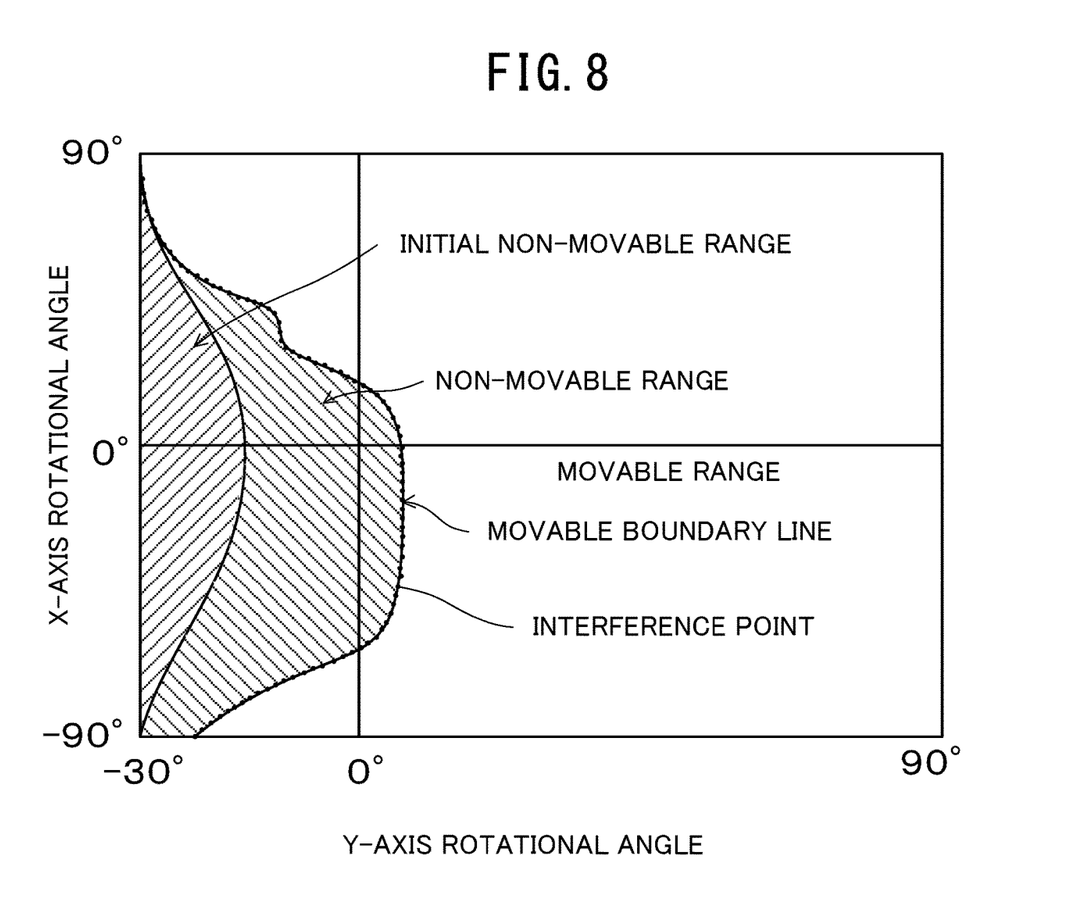
FIG. 8 is a diagram illustrating a movable range according to the embodiment of the present disclosure.

Next, a detailed example of the drive processing that is executed by the robot 100 according to the present embodiment is described with reference to FIG. 7 and FIG. 8. As illustrated in (A) of FIG. 7, it is assumed that the torso 101 of the robot 100 is fitted with the accessory R illustrated in (B) of FIG. 7.

When the user turns the power button ON by operating the operation unit 120, the robot 100 responds to the instruction to turn the power ON and starts the drive processing.

When the user says "The ______ is fitted" to the robot 100, the fit-on determiner 111 detects an utterance uttered by the user (step S101 of FIG. 5), and makes a determination that the utterance uttered by the user includes an utterance indicating that the accessory has been fitted onto the robot 100 (YES in step S102 of FIG. 5).

Next, the setter 112 moves the right arm 103R and the left arm 103L to the initial position (step S105 of FIG. 5). Next the interference drive control processing for the left arm is executed (step S106 of FIG. 5).

Once the interference drive control processing for the left arm begins, the setter 112 causes the left arm 103L to perform Y-axis rotation towards the torso 101 (step S201 of FIG. 6). Next, upon determination that the left arm 103L caused interference (YES in step S202 of FIG. 6), the X-axis rotational angle and the Y-axis rotational angle of the left arm 103L are stored as interference points into the ROM 150 (step S203 of FIG. 6) as illustrated in FIG. 8.

Next, an X-axis rotation equal to the reference angle amount is performed on the left arm 103L (step S204 of FIG. 6). Next, the interference determiner 113 makes a determination as to whether or not the left hand 105L came into contact with the accessory R (step S205 of FIG. 6). Upon determining of the interference (YES in step S205 of FIG. 6), Y-axis rotation of the left arm 103L is performed, and the left arm 103L is driven in a direction away from the torso 101 (step S206 of FIG. 6). When, based on this, a determination is made that when a determination is made that there is no longer interference by the left hand 105L (NO in step S207 of FIG. 6), the X-axis rotational angle and the Y-axis rotational angle of the left arm 103L are stored as interference points into the ROM 150 (step S208 of FIG. 6).

Next, a determination is made as to whether or not the X-axis rotational angle of the left arm 103L is the end point angle (step S209 of FIG. 6). Upon determination that the X-axis rotational angle is not the end point angle (NO in step S209 of FIG. 6), step S204 to step S209 is repeated. Upon determination that the X-axis rotational angle is the end point angle (YES in step S209 of FIG. 6), the left arm 103L is returned to the initial position (step S210 of FIG. 6). Thereafter, processing is returned to the drive processing from which the interference drive control processing for the right arm is executed in a manner similar to that of the interference drive control processing for the left arm (step S107 of FIG. 5).

Next, the setter 112 creates maps of the movable ranges of the right arm 103R and the left arm 103L and stores the created maps into the ROM 150 (step S108 of FIG. 5). Specifically, as illustrated in FIG. 8, a map of the movable range is created based on the X-axis rotational angle and the Y-axis rotational angle of the left arm 103L stored as interference points in the ROM 150. For the right arm 103R, a map of the movable range is likewise created. In doing so, a movable range, a movable boundary line composed of the multiple interference points, and a non-movable range are set. An initial non-movable range is a non-movable range prior to the robot 100 being fit with the accessory R. This initial non-movable range is set in advance at, for example, at the time of shipping from the factory of the robot 100.

Next, the drive controller 114 refers to the created maps of the movable ranges stored in the ROM 150, and controls the first driver 104R and the second driver 104L such that the right arm 103R and the left arm 103L are respectively driven within the set movable ranges (step S109 of FIG. 5). Next, when a determination is made that an end instruction was received (YES in step S110 of FIG. 5), the drive processing is ended.

As described above, if the robot 100 according to the present embodiment is fitted with an accessory, the fit-on determiner 111 determines that the robot 100 is fitted with the accessory. The setter 112 executes the interference drive control processing for both the left arm and the right arm, creates maps of the movable ranges, and stores the created maps into the ROM 150. The robot 100 drives the right arm 103R and the left arm 103L within the movable ranges. In doing so, the robot 100 is able to determine that the accessory has been fitted onto the robot 100 and the right arm 103R and the left arm 103L, which are the movable parts, can be driven such that there is no coming into contact with the accessory. Since the right arm 103R and the left arm 103L, which are the movable parts, are driven such that there is no interference with the accessory, the first driver 104R and the second driver 104L can be prevented from being subjected to excessive load. Also, the occurrence of noise or breakage or damage of the accessory caused by the movable parts interfering with the accessory can be prevented.

Also, the robot 100 is able to create maps of movable ranges by acquiring data indicating the positions of the right arm 103R and the left arm 103L and then setting the movable ranges of the right arm 103R and the left arm 103L based on the positions of the right arm 103R and the left arm 103L.

Also, the robot 100 can shorten the creation time needed to create the maps of the movable ranges by executing the interference drive control processing in which the drivers are controlled such that the accessory interferes with the operation of the right arm 103R and left arm 103L.

Also, with the inclusion of the fit-on determiner 111, the robot 100 is able to make a determination as to whether or not the robot 100 is fitted with an accessory, and thus when the robot is fitted with an accessory, the robot 100 can execute the interference drive control processing without any operation by the user.

Also, with the inclusion of the ROM 150 that stores data indicating an initial image that is an image of the robot 100 in the initial state, the robot 100 is able to make a determination as to whether or not the robot 100 is fitted with an accessory by comparing an image of the robot 100 in its current state with the initial image stored in the ROM 150.

Also, when the robot is not fitted with the accessory, the robot 100 is able to prevent the movable parts from interfering with the torso 101 by driving the right arm 103R and the left arm 103L within the initial movable range.

Also, with the inclusion of the pressure sensor 140 within the right hand 105R and the pressure sensor 140 within the left hand 105L, the robot 100 is able to make a determination as to whether or not an accessory has interfered with the driving of the of the right arm 103R and the left arm 103L.

MODIFIED EXAMPLES

In the previously-described embodiment, the accessory R is described as being fitted onto the robot 100. It is sufficient as long as the accessory to be fitted onto the robot 100 can be fitted onto the robot 100. As illustrated in (C) of FIG. 9 to (E) of FIG. 9, the accessory R, an accessory S illustrated in (A) of FIG. 9, and an accessory T illustrated in (B) of FIG. 9 may be fitted onto the robot 100.

In the previously-described embodiment, the fit-on determiner 111 of the robot 100 is described as using an utterance in determining that the robot 100 has been fitted with an accessory or using a captured image of the robot 100 reflected in a mirror in determining that the robot 100 has been fitted with the accessory. It is sufficient as long as the fit-on determiner 111 can determine that the robot 100 has been fitted with an accessory. For example, the robot 100 may be connected in a communication-capable manner with an electronic device that includes a camera and the electronic device may transmit to the robot 100 an image of the robot 100 captured by the electronic device. In such a case, the fit-on determiner 111 may compare the captured image of the robot 100 against the initial image of the robot 100 that is saved in advance in the robot 100 to determine that the robot 100 is fitted with the accessories R and T.

Also, the fit-on determiner 111 may acquire, from an electronic device operated by a user, accessory fit-on information indicating that an accessory is fitted onto the robot 100, and may make a determination as to whether or not the accessory is fitted onto the robot 100 based on the accessory fit-on information. Also, the fit-on determiner 111 may use a pressure sensor attached to the right foot 106R and the pressure sensor attached to the left foot 106L to measure the weight of the robot 100, and may determine that the robot 100 has been fitted with the accessory if the weight has increased. Also, the robot 100 may periodically capture images of the mirror to determine that the robot 100 has been fitted with an accessory. Also, an accessory may include a communicator that transmits a signal indicating that the accessory is fitted onto the robot 100 and the robot 100 may include a communicator that receives the signal from the accessory indicating that the accessory is fitted onto the robot 100. In such a case, the accessory transmits the signal to the robot and when the robot 100 receives the signal indicating that the accessory is fitted onto the robot 100, the robot 100 may make a determination that the robot 100 is fitted with the accessory.

Figure 10:
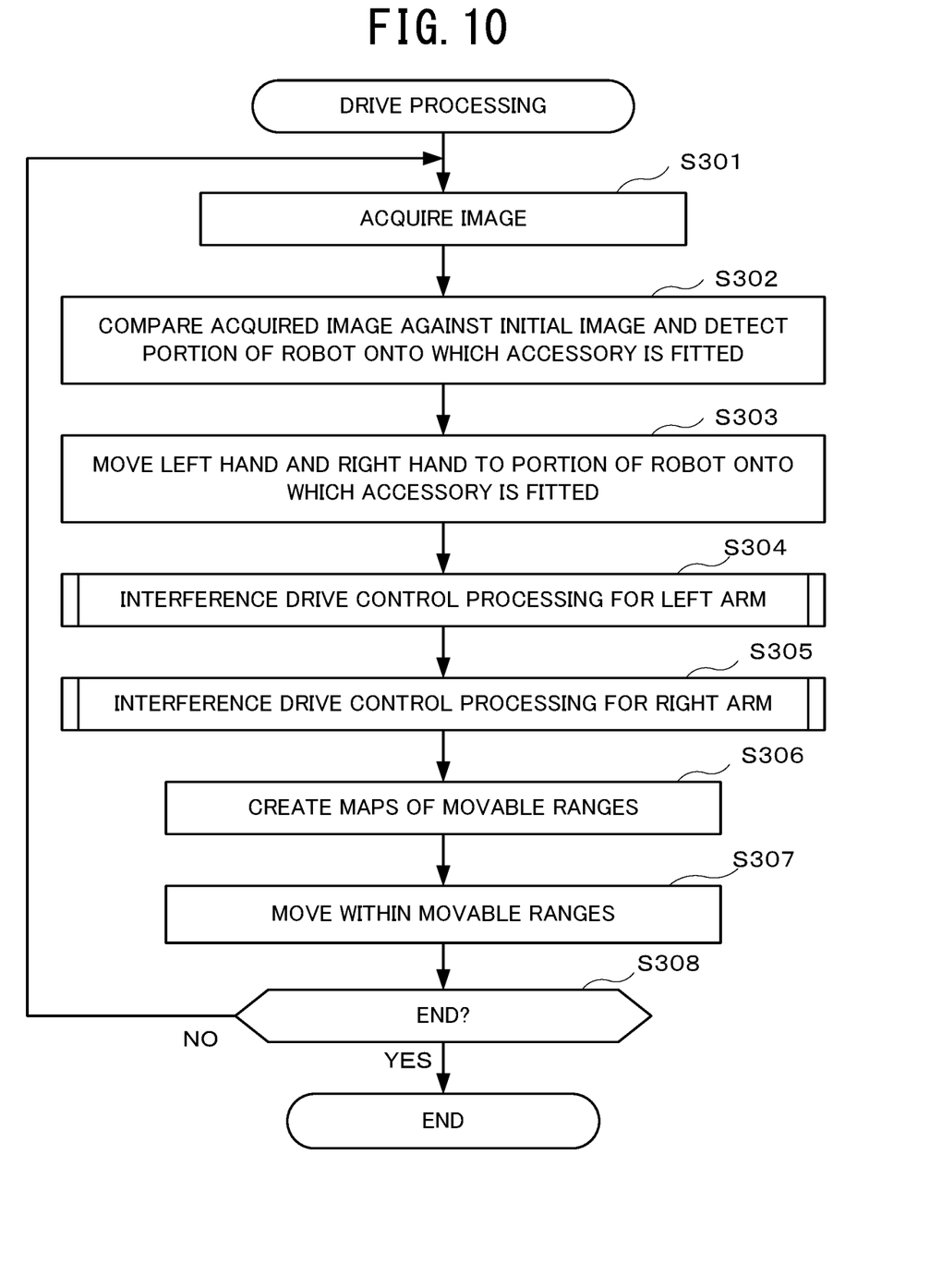
FIG. 10 is a flowchart illustrating a drive processing according to a modified example of the present disclosure.

In the previously-described embodiment, although the fit-on determiner 111 is described as making a determination as to whether or not the robot 100 is fitted with an accessory, the fit-on determiner 111 may detect a portion onto which the accessory is fitted. In such a case, the setter 112 may execute the interference drive control processing to control the first driver 104R and the second driver 104L such that the right hand 105R and the left hand 105L are respectively made to come into contact with the accessory positioned at the portion detected by the fit-on determiner 111. For example, as illustrated in FIG. 10, the fit-on determiner 111 acquires an image of the robot 100 captured by an electronic device (step S301). Next, the fit-on determiner 111 compares the acquired image against the initial image of the robot 100 stored in advance and detects the portion onto which the accessory is fitted (step S302). Next, the setter 112 causes the right hand 105R and the left hand 105L to move to the portion onto which the accessory is fitted (step S303).

Next, the setter 112 executes the interference drive control processing for the left hand with respect to the portion onto which the accessory is fitted (step S304). Next the setter 112 executes the interference drive control processing for the right hand with respect to the portion onto which the accessory is fitted (step S305). The setter 112 creates maps of the movable ranges (step S306). The drive controller 114 refers to the created maps of the movable ranges and moves the right arm 103R and the left arm 103L within the movable ranges (step S307). Next, if a determination is made that an end instruction was not received (NO in step S308), step S301 to step S308 is repeated. Next, if a determination is made that an end instruction was received (YES in step S308), the drive processing is ended. In such a case, if, for example, accessory is attached to the robot 100 at a position of the chest or the lower back, the setter 112 executes the interference drive control processing for both the left arm and the right arm with respect to that position only, and creates maps of the movable ranges. The interference drive control processing for both the left arm and the right arm and the creation of maps of the movable ranges is executed using a method similar to that of the previously-described embodiment. In doing so, the maps of the movable ranges can be created in a short period of time.

In the previously-described embodiment, the interference determiner 113 of the robot 100 is described as making a determination as to whether or not the right hand 105R or the left hand 105L came into contact with an accessory based on whether or not pressure was detected by the pressure sensor 140. However, it is sufficient as long as the interference determiner 113 can make a determination as to whether or not the left arm 103L, the right arm 103R, the right hand 105R, or the left hand 105L came into contact with the accessory. For example, in a case in which the right hand 105R and the left hand 105L each include an acceleration sensor such as a 6-axis motion sensor, if the change in acceleration that is greater than or equal to a reference value is detected, a determination may be as to whether or not the left arm 103L, the right arm 103R, the right hand 105R, or the left hand 105L came into contact with the accessory. In such a case, when one of the components among the left arm 103L, the right arm 103R, the left hand 105R, and the left hand 105L comes into contact with the accessory, since the 6-axis motor sensors detect changes in acceleration, interference can be determined for components other than the right hand 105R and the left hand 105L. Also, the first driver 104R and the second driver 104L may each include a torque sensor and the interference determiner 113 may make a determination as to whether or not any components among the left arm 103L, the right arm 103R, the right hand 105R, and the left hand 105L are coming into contact with the accessory, based on the torque detected by the first driver 104R and the second driver 104L.

In the previously-described embodiment, the setter 112 is described as causing the left arm 103L to perform an X-axis rotation equal to a reference angle amount of, for example, 1° while keeping the Y-axis rotational angle the same, and identifying the interference point. However, the setter 112 may identify a representative point as the interference point and may obtain points other than the representative point by use of an interpolation calculation. Also, the setter 112 may establish a margin for the interference point and accordingly create a movable boundary line. In doing so, the right hand 105R and the left hand 105L can be prevented from interfering with an accessory even if an error occurs with the first driver 104R and the second driver 104L. Also, the ROM 150 further stores a prescribed initial movable range illustrated in FIG. 8 as a movable range of the movable parts while the robot 100 is not fitted with an accessory, and in a case in which a determination is made by the fit-on determiner 111 that the robot 100 is not fitted with an accessory, the drive controller 114 controls the first driver 104R and the second driver 104L such that the right arm 103R and the left arm 103L are respectively driven within the initial movable range.

In the previously-described embodiment, the setter 112 is described as executing the interference drive control processing for the right arm after executing the interference drive control processing for the left arm. However, the setter 112 may execute the interference drive control processing for the right arm while executing the interference drive control processing for the left arm. In such a case, execution is conducted in a manner such that the right hand 105R and the left hand 105L do not interfere with each other. For example, during the interference drive control processing for the right arm and the left arm, the X-axis rotational angle of the first driver 104R and the X-axis rotational angle of the second driver 104L are offset from each other.

In the previously-described embodiment, the positions of the right arm 103R and right hand 105R and the left arm 103L and the left hand 105L, which are movable parts, are described as being respectively determined by the X-axis rotation and Y-axis rotation of the first driver 104R and the second driver 104L. Any method may be used for indicating the positions of the movable parts. In a case in which the movable parts move along the X-axis and the Y-axis, the positions of the movable parts may be determined based on the movement distance and a movement direction from a reference point.

In the previously-described embodiment, an example is described in which the setter 112, upon the robot 100 being fitted with an accessory, executes the interference drive control processing in which the drive is controlled such that the movable parts come into contact with the accessory, and creates (update) the maps of the movable ranges. As long as the maps of the movable ranges are creatable, the setter 112 may execute a movable range setting processing for the left arm.

In the interference drive control processing, after the X-axis rotational angle and the Y-axis rotational angle of the left arm 103L are stored into the ROM 150 as interference points in step S203, the X-axis rotation equal to the reference angle amount is performed on the left arm 103L in step S204. Contrary to this, in the movable range setting processing, after the X-axis rotational angle and the Y-axis rotational angle are stored as interference points, the left arm 103L is moved away from the torso 101 by performing Y-axis rotation while keeping the X-axis rotational angle the same. Thereafter, an X-axis rotation equal to the reference angle amount is performed on the left arm 103L while keeping the Y-axis rotational angle the same, and then, Y-axis rotation of the left arm 103L towards the torso 101 is performed while keeping the X-axis rotational angle the same. When the left hand 105L comes into contact with an accessory, the X-axis rotational angle and the Y-axis rotational angle are stored as interference points. These operations are continued until the X-axis rotational angle reaches the end point. The interference drive control processing for the right arm is executed in a manner similar to that of the interference drive control processing for the left arm. In doing as described above, maps of movable ranges can be created even if the right hand 105R and the left hand 105L do not have elastic bodies.

In the previously-described embodiment, an example is described where, each time the robot 100 is fitted with an accessory, the interference drive control processing for both the left arm and the right arm is executed, and maps of movable ranges for when the accessory is fitted onto the robot 100 are stored into the ROM 150. When an accessory for which a map of the movable range has been created is fitted onto the robot 100 again, the created map of the movable range stored in the ROM 150 may be applied again. In doing so, the process of creating a map of the movable range when the accessory is removed and then reattached can be omitted. In such a case, if there are multiple types of accessories, a map of the movable range for when an accessory is attached to the robot 100 is created and stored for each type of accessory.

In the previously-described embodiment, although the accessory is described as being attached to the torso 101, an accessory may be attached to the left arm 103L and/or the right arm 103R, which are movable parts. For example, an accessory such as a tennis racket may be attached to the right arm 103R. In a case in which, when the right arm 103R is driven, the accessory comes into contact with the torso 101 thereby hampering operation of the right arm 103R, this situation constitutes as interference with a movable part by an accessory. In such a case, a map of the movable range is created such that the accessory that is attached to the right arm 103R does not come into contact with the torso 101.

In the previously-describe embodiment, the setter 112 is described as executing the interference drive control processing and the interference determiner 113 is described as setting a movable range based on whether or not pressure was detected. However, it is sufficient as long as the interference determiner 113 can make a determination as to whether or not an accessory interferes with operation of a movable part, and the setter 112 can set a movable range. For example, a determination by the interference determiner 113 as to whether or not an accessory interferes with an operation of a movable part may be performed by identifying the type of the accessory fitted onto the robot 100 and the position where the accessory is fitted onto the robot 100. In such a case, the interference determiner 113 identifies the type of the accessory fitted onto the robot 100 and the position where the accessory is fitted onto the robot 100 by a sensor provided on the robot 100 or an external terminal via a communicator. The setter 112 reads, from the ROM 150, data of the movable range that is associated with the accessory that is fitted onto the robot 100, or acquires the data from the external terminal.

In the previously-described embodiment, although the initial movable range is described as being stored in the ROM 150, the advance storing of the initial movable range by the controller 110 is not a necessity. For such a case, the controller 110 further includes an initial moveable range acquirer that acquires a prescribed initial movable range as a movable range of a movable part for when the robot 100 is not fitted with an accessory. The initial moveable range acquirer acquires an initial movable range from an external data or a network via the communicator. With the configuration in this manner, the movable ranges can be acquired without executing the interference drive control processing for the right arm and the left arm. The initial movable range acquirer is included in the drive controller 114.

In the previously-described embodiment, the robot 100 is described as having the right arm 103R and the left arm 103L as movable parts. However, the robot 100 may have just a single movable part or may have three or more movable parts. Also, although the right arm 103R and the left arm 103L are driven as movable parts of the robot 100 by the first driver 104R and the second driver 104L that serve as portions of the shoulders, additional drivers may be provided where the elbows and/or the wrists are located such that the elbow portions and/or the wrists portions can be driven. In doing so, human-like movement can be achieved. In such a case, the drivers of the shoulders, elbows, and wrists are driven in combinations and permutations, and maps of movable ranges are created.

In the previously-described embodiment, the robot 100 is described as resembling a human, the shape of the robot is not limited. For example, the shape of the robot 100 may resemble an animal such as a dog or cat, or resemble that of an animation character or imaginary creature. Such a robot 100 can be used as a pet robot. Also, it is sufficient as long as the robot 100 a movable part that is driven by a driver. The robot 100 encompasses, for example, industrial robots that assemble products.

Further, the main portions for performing the processing that is executed by the controller 110 including the CPU, the ROM 150, the RAM 160, and the like can be executed by an ordinary portable information terminal (smartphone, tablet personal computer (PC)), a PC, and the like without the use of a dedicated system. For example, a computer program for executing the aforementioned operations can be stored and distributed on a non-transitory computer-readable recording medium, such as a flexible disc, a compact disc read only memory (CD-ROM), a digital versatile disc read only memory (DVD-ROM), and the like, and then by installing the computer program on the portable information terminal and the like, the portable information terminal and the like may be configured as the information terminal for execution of the aforementioned processing. Further, the computer program may be stored in a storage device included in a server device on a communication network such as the Internet, and the information processing device may be configured by a normal information processing terminal and the like downloading the computer program.

Further, in cases such as those in which the functions of the controller 110 are shared by an operating system (OS) and application programs, or in cases in which execution is performed in cooperation between the OS and the application programs, storing of just the application program portion on the non-transitory computer-readable recording medium or the storage device is permissible.

Further, the computer program may be superimposed on a carrier wave, and then may be distributed via a communication network. For example, this computer program may be posted to a bulletin board system (BBS) on a communication network, and the computer program may be distributed via the network. Further, a configuration may be used such that the aforementioned processing can be executed by starting and executing the program under control of an operating system (OS) in the same manner as other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A control device, comprising:
a processor configured to:
when an accessory is fitted onto an apparatus, control a driver such that the accessory interferes with operation of a movable part of the apparatus;
acquire data indicating a position of the movable part at which the accessory interferes with the operation of the movable part; and
control the driver such that the movable part is driven within a movable range which is set based on the acquired data indicating the position of the movable part.

2. The control device according to claim 1, wherein the processor determines whether or not the accessory is fitted onto the apparatus, and controls the driver such that the accessory interferes with the operation of the movable part when a determination is made that the accessory is fitted onto the apparatus.

3. The control device according to claim 2, further comprising:
a memory that stores data indicating an initial image being an image of the apparatus in an initial state in which the accessory is not fitted onto the apparatus,
wherein the processor acquires data indicating an image captured by the apparatus, compares the image of the apparatus indicated by the acquired data against the initial image stored in the memory, and determines whether or not the accessory is fitted onto the apparatus.

4. The control device according to claim 2, wherein the processor acquires, from a user of the apparatus, accessory fit-on information indicating that the accessory is fitted onto the apparatus, and determines whether or not the accessory is fitted onto the apparatus, based on the accessory fit-on information.

5. The control device according to claim 2, wherein the processor:
acquires an initial movable range as a movable range of the movable part for when the accessory is not fitted onto the apparatus, and
controls the driver such that the movable part is driven within the initial movable range when a determination is made that the accessory is not fitted onto the apparatus.

6. The control device according to claim 2, wherein the processor:
detects a portion of the apparatus onto which the accessory is fitted, and
controls the driver such that the movable part comes into contact with the accessory positioned at the detected portion.

7. The control device according to claim 1, further comprising:
a sensor provided on the movable part, the sensor detecting contact with the movable part,
wherein the processor determines, based on a detection result of the sensor, whether or not the accessory interferes with driving of the movable part.

8. A robot comprising:
a movable part;
an actuator configured to drive the movable part; and
a processor configured to:
when an accessory is fitted onto the robot, control the actuator such that the accessory interferes with operation of the movable part;
acquire data indicating a position of the movable part at which the accessory interferes with the operation of the movable part; and
control the actuator such that the movable part is driven within a movable range which is set based on the acquired data indicating the position of the movable part.

9. A method for controlling a control device that controls an apparatus, the method comprising:
when an accessory is fitted onto the apparatus, controlling a driver such that the accessory interferes with operation of a movable part of the apparatus;
acquiring data indicating a position of the movable part at which the accessory interferes with the operation of the movable part; and
controlling the driver such that the movable part is driven within a movable range which is set based on the acquired data indicating the position of the movable part.

10. A non-transitory computer-readable recording medium storing a program causing a computer that controls an apparatus to function as:
a first driver controller configured to, when an accessory is fitted onto the apparatus, control a driver such that the accessory interferes with operation of a movable part of the apparatus;
an acquirer configured to acquire data indicating a position of the movable part at which the accessory interferes with the operation of the movable part by the control performed by the first drive controller; and
a second driver controller configured to control the driver such that the movable part is driven within a movable range which is set based on the data indicating the position of the movable part acquired by the acquirer.

* * * * *